(12) United States Patent
Minowa

(10) Patent No.: US 10,705,371 B2
(45) Date of Patent: Jul. 7, 2020

(54) COLOR FILTER SUBSTRATE, MANUFACTURING METHOD THEREOF, DISPLAY PANEL, MANUFACTURING METHOD THEREOF AND BRIGHT SPOT DEFECT CORRECTION METHOD THEREOF, AND DISPLAY APPARATUS

(71) Applicant: MITSUBISHI ELECTRIC CORPORATION, Tokyo (JP)

(72) Inventor: Kenichi Minowa, Kikuchi (JP)

(73) Assignee: Mitsubishi Electric Corporation, Tokyo (JP)

( * ) Notice: Subject to any disclaimer, the term of this patent is extended or adjusted under 35 U.S.C. 154(b) by 56 days.

(21) Appl. No.: 15/461,689

(22) Filed: Mar. 17, 2017

(65) Prior Publication Data

US 2017/0285395 A1    Oct. 5, 2017

(30) Foreign Application Priority Data

Mar. 30, 2016 (JP) .................................. 2016-067378

(51) Int. Cl.
G02F 1/1335 (2006.01)
G02F 1/13 (2006.01)

(52) U.S. Cl.
CPC ...... *G02F 1/133514* (2013.01); *G02F 1/1309* (2013.01); *G02F 1/133512* (2013.01); *G02F 1/133516* (2013.01)

(58) Field of Classification Search
CPC ......... G02F 1/133514; G02F 1/133516; G02F 1/1309; G02F 1/133512; G02F 2201/123; G02F 2201/52; G02F 1/136209; G02F 2001/13398

USPC ........................................ 359/890, 885, 891
See application file for complete search history.

(56) References Cited

U.S. PATENT DOCUMENTS

| | | | | |
|---|---|---|---|---|
| 6,671,025 | B1* | 12/2003 | Ikeda | G02F 1/133514 349/106 |
| 7,868,993 | B2* | 1/2011 | Lim | G02F 1/133512 349/187 |
| 7,952,659 | B2 | 5/2011 | Takahashi et al. | |
| 2006/0181672 | A1 | 8/2006 | Son | |
| 2012/0242939 | A1* | 9/2012 | Li | G02F 1/133514 349/106 |

FOREIGN PATENT DOCUMENTS

| | | |
|---|---|---|
| JP | 2006-227621 A | 8/2006 |
| JP | 2007-256371 A | 10/2007 |
| JP | 2008-165164 A | 7/2008 |
| JP | 2011-504599 A | 2/2011 |

(Continued)

OTHER PUBLICATIONS

An Office Action mailed by the Japanese Patent Office dated Dec. 10, 2019, which corresponds to Japanese Patent Application No. 2016-067378 and is related to U.S. Appl. No. 15/461,689.

*Primary Examiner* — Jade R Chwasz
(74) *Attorney, Agent, or Firm* — Studebaker & Brackett PC

(57) ABSTRACT

A color filter substrate includes: a transparent substrate; and a black matrix film, a color material film, and a repair color material film, which are formed on the substrate, wherein, in a display region, the repair color material film is formed on one of an upper surface and a lower surface of the black matrix film in at least a part overlapping the black matrix film in a plan view.

1 Claim, 13 Drawing Sheets

(56) References Cited

FOREIGN PATENT DOCUMENTS

| | | | |
|---|---|---|---|
| JP | 2011-107379 | A | 6/2011 |
| JP | 2014-102445 | A | 6/2014 |
| JP | 2014-215387 | A | 11/2014 |
| JP | 2016-194624 | A | 11/2016 |

* cited by examiner

COLOR FILTER SUBSTRATE, MANUFACTURING METHOD THEREOF, DISPLAY PANEL, MANUFACTURING METHOD THEREOF AND BRIGHT SPOT DEFECT CORRECTION METHOD THEREOF, AND DISPLAY APPARATUS

CROSS-REFERENCE TO RELATED APPLICATION

This application claims priority from Japanese Patent Application No. 2016-067378 filed on Mar. 30, 2016, the entire subject matter of which is incorporated herein by reference.

TECHNICAL FIELD

This disclosure relates to a color filter substrate, a manufacturing method thereof, a display panel, a manufacturing method thereof and a bright spot defect correction method thereof, and a display apparatus, by which blackening spot repair of a bright spot defective pixel is achieved.

BACKGROUND

A liquid crystal display panel of a general liquid crystal display apparatus includes a liquid crystal, a thin film transistor (hereinafter, referred to as a "TFT") array substrate, and a color filter (hereinafter, referred to as a "CF") substrate that interposes the liquid crystal between the TFT array substrate and the CF substrate. In the CF substrate, a black matrix is formed, and in the TFT array substrate, a signal wiring and a scanning wiring are formed in a region covered by the black matrix.

In the liquid crystal display panel, due to mixing-in of impurities and the like in a manufacturing process, a defect called a bright spot defect may occur. Since the bright spot defect allows light to pass therethrough regardless of a signal applied to the TFT, even though a screen is displayed to be black, there is a defect in which one pixel or a smaller number of pixels are always lightened, so that it is easily viewed by human eyes and thus display quality is significantly reduced. Therefore, the liquid crystal display panel with the bright spot defect is discarded as a defective product in many cases, and causes yield reduction in liquid crystal display panel manufacturing.

In this regard, for example, JP-A-2011-504599 discloses a technology for correcting a bright spot defect in a liquid crystal display panel, so-called "blackening spot repair". Specifically, laser is irradiated to a pixel (hereinafter, referred to as a "bright spot defective pixel") with the bright spot defect, so that a gap is formed between a color material of a color filter and a glass substrate. Then, a black matrix (resin) adjacent to the bright spot defective pixel having the gap is decomposed through laser irradiation, so that the black matrix is diffused into the gap. According to such a technology, the bright spot defective pixel can be converted into an inconspicuous black spot.

SUMMARY

However, in the aforementioned blackening spot repair of the bright spot defective pixel, when a large part of the scattered black matrix is flown into the gap of the bright spot defective pixel, the amount of the black matrix, in a position in which the black matrix has been originally formed, may be excessively reduced. Therefore, the black matrix may partially become excessively thin and may not partially exist.

As a consequence, since light passing through the gap between the signal wiring and the scanning wiring of the TFT array substrate passes through a position in which the black matrix becomes excessively thin and a position in which the black matrix does not exist, the light leaks to a display surface side of the liquid crystal display panel, so-called "light leakage" occurs, so that display quality is deteriorated.

This disclosure is to provide a color filter substrate, a manufacturing method thereof, a display panel, a manufacturing method thereof and a bright spot defect correction method thereof, and a display apparatus, by which it is possible to reduce light leakage occurring when a bright-spot-defective pixel part is subjected to blackening spot repair.

Each of a color filter substrate, a display panel, and a display apparatus according to this disclosure includes a transparent substrate, and a black matrix film, a color material film, and a repair color material film formed on the substrate, wherein, in a display region, the repair color material film is formed on any one of an upper surface and a lower surface of the black matrix film in at least a part overlapping the black matrix film in a plan view.

Furthermore, each of a manufacturing method of a color filter substrate and a manufacturing method of a display panel according to this disclosure includes forming a black matrix film on a transparent substrate, forming a color material film, and forming a repair color material film in at least a part overlapping the black matrix film in a plan view in a display region.

Furthermore, in a bright spot defect correction method of a display panel according to this disclosure, black matrix film fluidization laser light is irradiated toward a black matrix film corresponding to a bright-spot-defective pixel part having a bright spot defect, so that the black matrix film is diffused to a region of the bright-spot-defective pixel part, and repair color material film blackening laser light is irradiated toward a repair color material film corresponding to the bright-spot-defective pixel part, so that the repair color material film is blackened to reduce transmittance.

Furthermore, in a bright spot defect correction method of a display panel according to this disclosure, repair color material film blackening laser light is irradiated toward a repair color material film corresponding to a bright-spot-defective pixel part having a bright spot defect, so that the repair color material film is blackened to reduce transmittance, and the blackened repair color material film is diffused to a region of the bright-spot-defective pixel part.

In accordance with the color filter substrate, the display panel, and the display apparatus according to this disclosure, even though the bright-spot-defective pixel part occurs, it is possible to reduce light leakage in a case where the bright-spot-defective pixel part is subjected to blackening spot repair.

Further, in accordance with the manufacturing method of the color filter substrate and the manufacturing method of the display panel according to this disclosure, even though the bright-spot-defective pixel part occurs, it is possible to provide the display apparatus that reduces light leakage in a case where the bright-spot-defective pixel part is subjected to blackening spot repair.

Further, in accordance with the bright spot defect correction method of the display panel according to this disclosure, even though the bright-spot-defective pixel part occurs, it is possible to provide the display apparatus that reduces light leakage in a case where the bright-spot-defective pixel part is subjected to blackening spot repair.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Embodiment

Figure 1:
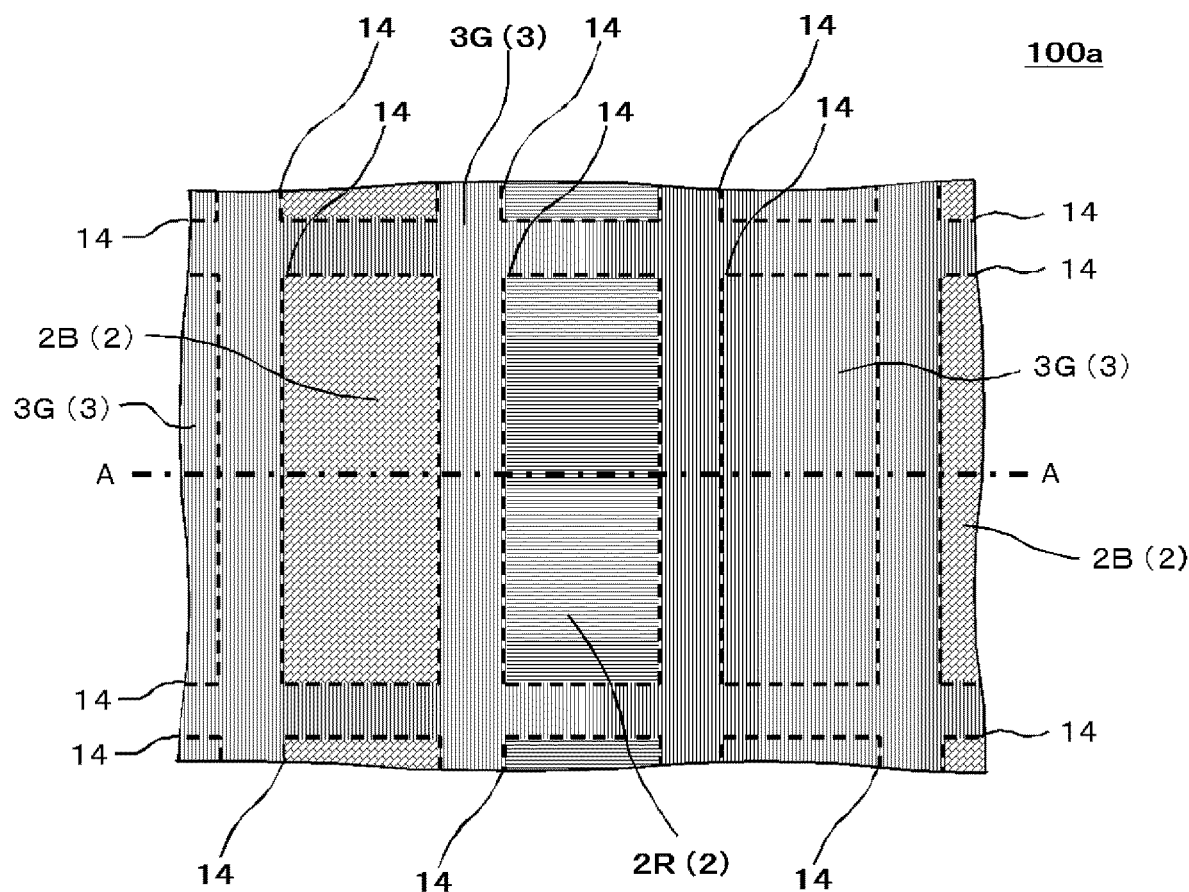
FIG. 1 is a top plan view illustrating a CF substrate of a first embodiment of this disclosure.
Figure 2:
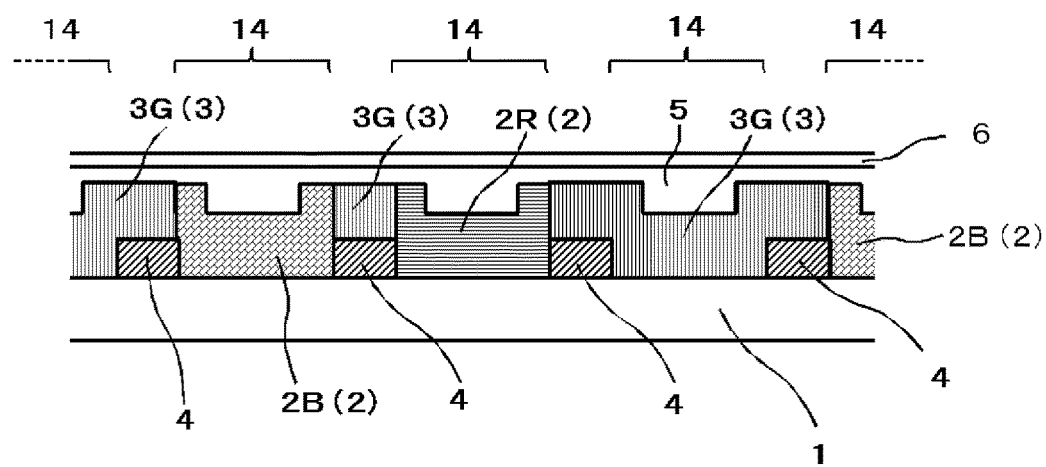
FIG. 2 is a sectional view illustrating the CF substrate of the first embodiment of this disclosure.

Firstly, a configuration of a CF substrate 100a serving as a color filter substrate of a first embodiment of this disclosure will be described. FIG. 1 is a top plan view illustrating the CF substrate 100a of the first embodiment of this disclosure. FIG. 2 is a sectional view illustrating the CF substrate 100a of a first embodiment of this disclosure. FIG. 2 illustrates a section A-A in FIG. 1.

A display region of the CF substrate 100a will be described using FIGS. 1 and 2. In FIGS. 1 and 2, in the display region of the CF substrate 100a, on a glass substrate 1 which is a transparent substrate, a black matrix film 4 is provided at boundary parts among pixels.

The black matrix film 4 is a film having a superior light blocking property, and for example, a black resinous film obtained by adding carbon to resin. Furthermore, for example, a thickness of the black matrix film 4 is equal to or more than 1 µm and is equal to or less than 3 µm. In consideration of the fact that a film having a light blocking property can be formed and serves as the black matrix film 4, the thickness is preferably equal to or more than 1 µm. On the other hand, in consideration of productivity, the thickness is preferably equal to or less than 3 µm.

In FIGS. 1 and 2, the CF substrate 100a has pixel openings 14. The pixel openings 14 are parts in which the black matrix film 4 is opened and light passes through. In order to tightly fill the pixel openings 14, a red material film 2R, a blue material film 29, and a repair color material film 3 are provided. In the display region, the repair color material film 3 is directly formed on an upper surface of the black matrix film 4 in at least a part overlapping the black matrix film 4 in a plan view.

In the specification of this disclosure, the display region indicates a region where pixels are formed. Furthermore, in this description, regarding an upper surface and a lower surface, for example, a surface near the glass substrate 1 is called the lower surface, and its opposite surface is called the upper surface in FIG. 2.

The repair color material film 3, for example, is a green (G) repair color material film 3G formed with a color material for a color filter obtained by adding a dispersing agent and the like to a halogenated copper phthalocyanine pigment or a brominated zinc phthalocyanine pigment, and allows light of a corresponding specific wavelength band to pass therethrough. When blackening spot repair is performed, the repair color material film 3 (3G) is easily blackened because thermal deformation due to laser light irradiation easily occurs and transmittance of visible light is efficiently reduced, as compared with the color material film 2 of other colors.

A thickness of the repair color material film 3, for example, is equal to or more than 1 μm and is equal to or less than 3 μm. In consideration of the fact that a film having a superior color reproductivity can be formed as the repair color material film 3, and a film having a light blocking property can be formed when it is blackened in blackening spot repair and serves as the repair color material film 3, the thickness is preferably equal to or more than 1 μm. On the other hand, in consideration of productivity and the fact that a film having a superior color reproductivity can be formed as the repair color material film 3, the thickness is preferably equal to or less than 3 μm.

The color material film 2, for example, is formed with a red (R) color material and is the red material film 2R that allows light of a corresponding specific wavelength band to pass therethrough. For example, a film and the like obtained by coloring polyimide-based, acryl-based, or epoxy-based resin are used.

A thickness of the red material film 2R, for example, is equal to or more than 1 μm and is equal to or less than 3 μm. In consideration of the fact that a film having superior color reproductivity can be formed as the color material film 2 and serves as the color material film 2, the thickness is preferably equal to or more than 1 μm. On the other hand, in consideration of productivity and the fact that a film having a superior color reproductivity can be formed as the color material film 2, the thickness is preferably equal to or less than 3 μm.

The other color material film 2, for example, is formed with a blue (B) color material and is the blue material film 2B that allows light of a corresponding specific wavelength band to pass therethrough. For example, a film and the like obtained by coloring polyimide-based, acryl-based, or epoxy-based resin are used.

A thickness of the blue material film 29, for example, is equal to or more than 1 μm and is equal to or less than 3 μm. In consideration of the fact that a film having superior color reproductivity can be formed as the color material film 2 and serves as the color material film 2, the thickness is preferably equal to or more than 1 μm. On the other hand, in consideration of productivity and the fact that a film having a superior color reproductivity can be formed as the color material film 2, the thickness is preferably equal to or less than 3 μm.

The red material film 2R, the blue material film 2B, and the repair color material film 3G are respectively divided for each pixel by the black matrix film 4, and are sequentially and repeatedly disposed.

In FIG. 2, an overcoat film 5 is provided on the red material film 2R, the blue material film 2B, and the green repair color material film 3G of the CF substrate 100a. The overcoat film 5 is a transparent film. The overcoat film 5 forms a planarized surface by planarizing unevenness formed by the black matrix film 4, the red material film 2R, the blue material film 2B, and the green repair color material film 3G. Even though impurities are generated from the black matrix film 4, the red material film 2R, the blue material film 2B, the green repair color material film 3G and the like, since the generation parts of the impurities are covered, it is possible to reduce diffusion of the impurities of the color filer to a liquid crystal 11.

The overcoat film 5, for example, is polyimide-based, epoxy-based, or acryl-based resin, and thermosetting type or photocurable type resin is used.

A thickness of the overcoat film 5, for example, is equal to or more than 1 μm and is equal to or less than 3 μm. In consideration of the fact that a film can be formed to form a planarized surface by planarizing unevenness of a lower layer, to cover generation parts of impurities generated from a lower film such as the color material film 2 and the repair color material film 3, to reduce diffusion of the impurities to the liquid crystal 11 and to serve as the overcoat film 5, the thickness is preferably equal to or more than 1 μm. On the other hand, in consideration of productivity, the thickness is preferably equal to or less than 3 μm.

In the CF substrate 100a, on the overcoat film 5, an opposite electrode 6 for applying a voltage to the liquid crystal 11 is provided. The opposite electrode 6, for example, is formed with a transparent conductive film such as indium tin oxide (ITO).

A thickness of the opposite electrode 6, for example, is equal to or more than 50 nm and is equal to or less than 150 nm. In consideration of the fact that sufficient electrical conduction can be ensured and functions of the opposite electrode 6 are performed, the thickness is preferably equal to or more than 50 nm. On the other hand, in consideration of productivity, the thickness is preferably equal to or less than 150 nm. The thickness is more preferably equal to or more than 80 nm and equal to or less than 120 nm.

In the CF substrate 100a, on the overcoat film 5, a columnar spacer (not illustrated) for defining a width of the liquid crystal 11 between a TFT array substrate 13 and the CF substrate 100a is provided.

Secondly, a manufacturing method of the CF substrate 100a of the first embodiment of this disclosure will be described. FIGS. 3 to 7 are sectionals views illustrating a part of the manufacturing process of the CF substrate 100a of the first embodiment of this disclosure.

Figure 3:
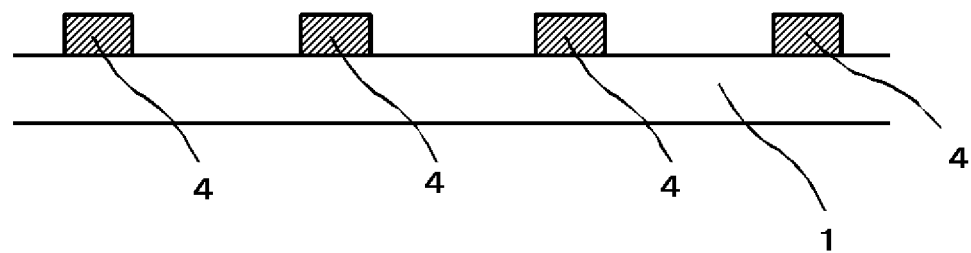
FIG. 3 is a sectional view illustrating a part of a manufacturing process of the CF substrate of the first embodiment of this disclosure.

First, by using photoengraving exposing, coating, and developing apparatus, black matrix resin is coated on the glass substrate 1, which is a transparent substrate, and exposing, developing, and baking are sequentially performed with a predetermined mask pattern, so that the black matrix film 4 having a thickness of about 2 μm is formed (FIG. 3).

Figure 4:
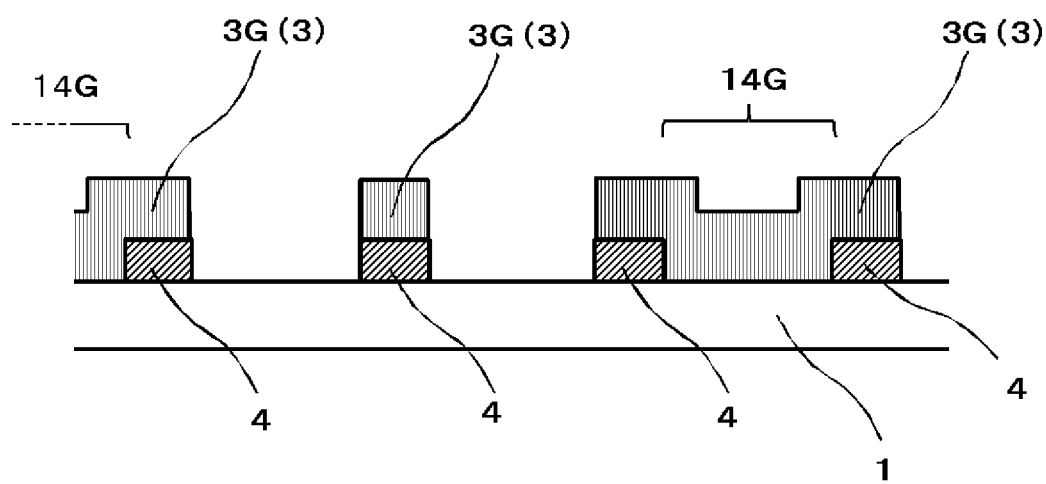
FIG. 4 is a sectional view illustrating a part of the manufacturing process of the CF substrate of the first embodiment of this disclosure.

Next, by using the photoengraving exposing, coating, and developing apparatus, a green repair color material (a repair color material) is coated, and exposing, developing, and baking are sequentially performed with a predetermined mask pattern, so that the green repair color material film 3G having a thickness of about 2 μm is formed so as to contact with an upper surface of the black matrix film 4 in at least a part overlapping the black matrix film 4 in a plan view in the display region. Simultaneously, the green repair color material film 3G is also formed in a green pixel opening 14G (FIG. 4).

Figure 5:
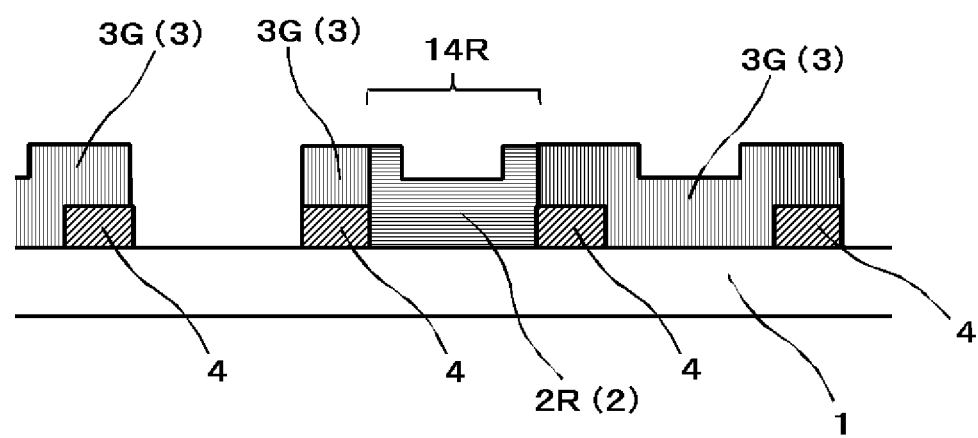
FIG. 5 is a sectional view illustrating a part of the manufacturing process of the CF substrate of the first embodiment of this disclosure.

Next, by using the photoengraving exposing, coating, and developing apparatus, a red color material is coated, and exposing, developing, and baking are sequentially performed with a predetermined mask pattern, so that a red color material film 2R having a thickness of about 2 μm is formed in a red pixel opening 14R (FIG. 5).

Figure 6:
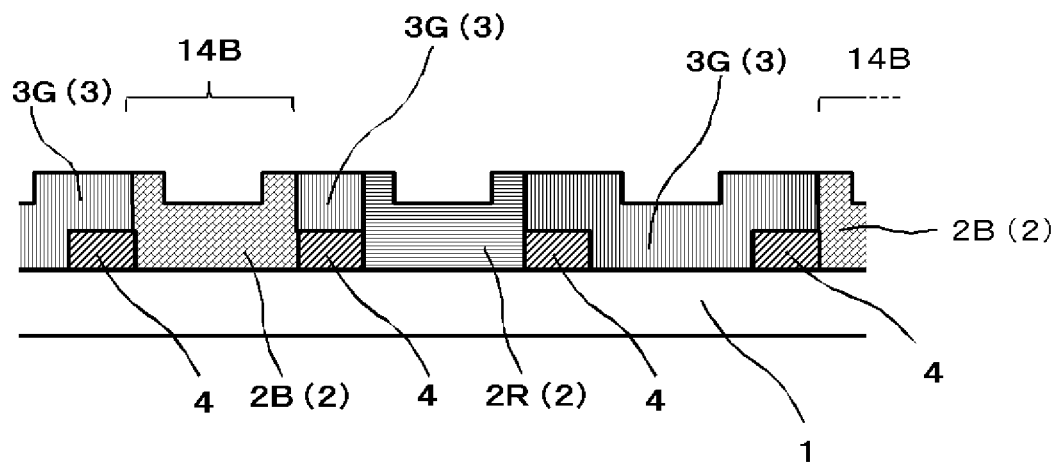
FIG. 6 is a sectional view illustrating a part of the manufacturing process of the CF substrate of the first embodiment of this disclosure.

Next, by using the photoengraving exposing, coating, and developing apparatus, a blue color material is coated, and exposing, developing, and baking are sequentially performed with a predetermined mask pattern, so that a blue color material film 2B having a thickness of about 2 μm is formed in a blue pixel opening 14B (FIG. 6).

Figure 7:
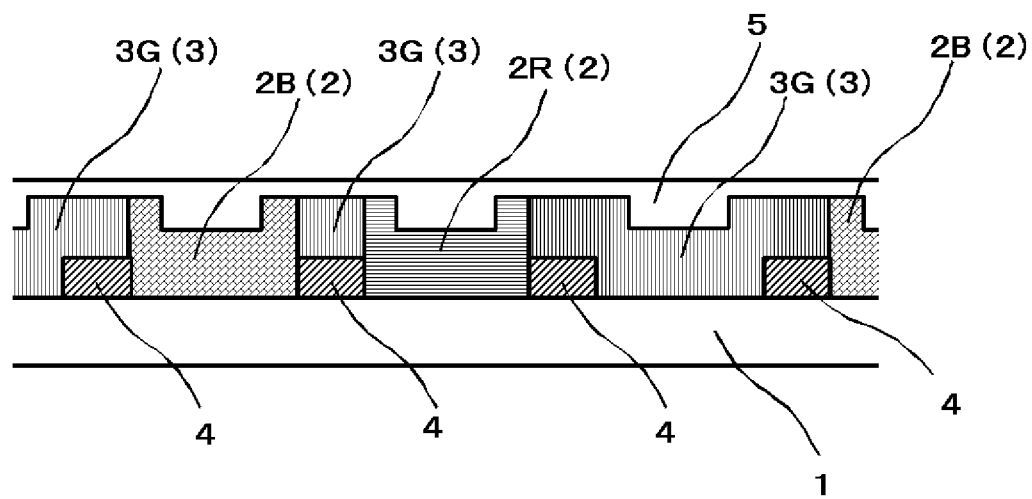
FIG. 7 is a sectional view illustrating a part of the manufacturing process of the CF substrate of the first embodiment of this disclosure.

Next, by using the photoengraving exposing, coating, and developing apparatus, overcoat resin is coated, and exposing, developing, and baking are sequentially performed with a predetermined mask pattern, so that the overcoat film 5 having a thickness of about 2 μm is formed (FIG. 7).

Next, by using a sputtering apparatus, an ITO having a thickness of about 100 nm is formed, and the opposite electrode 6 is formed on the overcoat film 5. Then, by using the photoengraving exposing, coating, and developing apparatus, spacer resin is coated, and exposing, developing, and baking are sequentially performed with a predetermined mask pattern, so that a columnar spacer (not illustrated) is formed on the opposite electrode 6 of the CF substrate 100a and thus the CF substrate 100a illustrated in FIGS. 1 and 2 is obtained.

Figure 8:
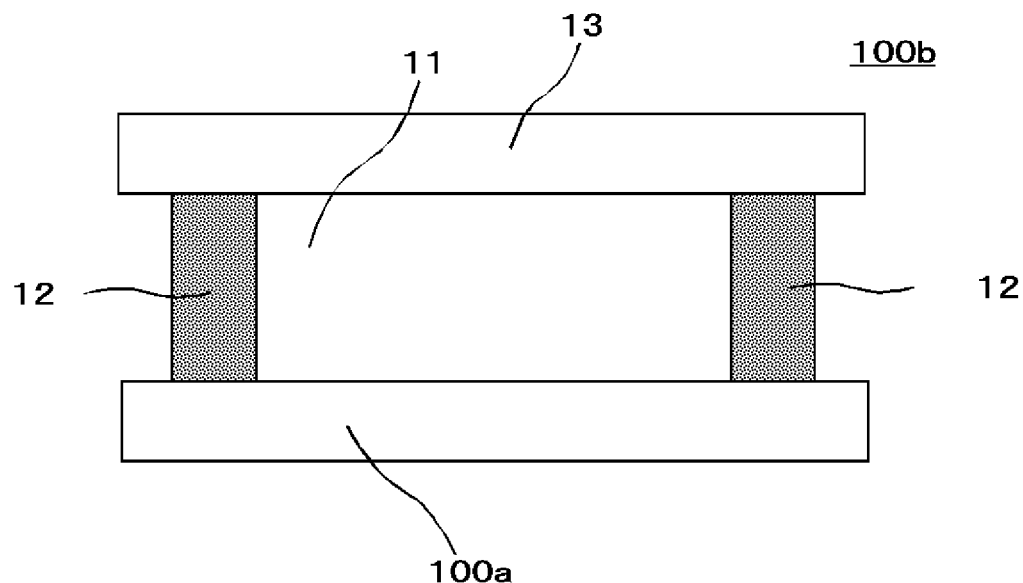
FIG. 8 is a sectional view illustrating a liquid crystal display panel of the first embodiment of this disclosure.

FIG. 8 is a sectional view illustrating a liquid crystal display panel 100b of the first embodiment of this disclosure. An alignment film (not illustrated) and the like are formed on the TFT array substrate 13 and the CF substrate 100a, then the TFT array substrate 13 and the CF substrate 100a are bonded with each other by a seal material 12, the liquid crystal 11 is encapsulated in a region formed by the TFT array substrate 13, the CF substrate 100a, and the seal material 12, and then a polarizing plate (not illustrated) and the like are respectively formed on the TFT array substrate 13 and the CF substrate 100a, so that the liquid crystal display panel 100b serving as a display panel is obtained as illustrated in FIG. 8.

The liquid crystal display panel 100b is connected to a driving circuit in a mounting process and is assembled with a backlight unit, a casing and the like, so that a liquid crystal display apparatus is obtained.

Figure 9:
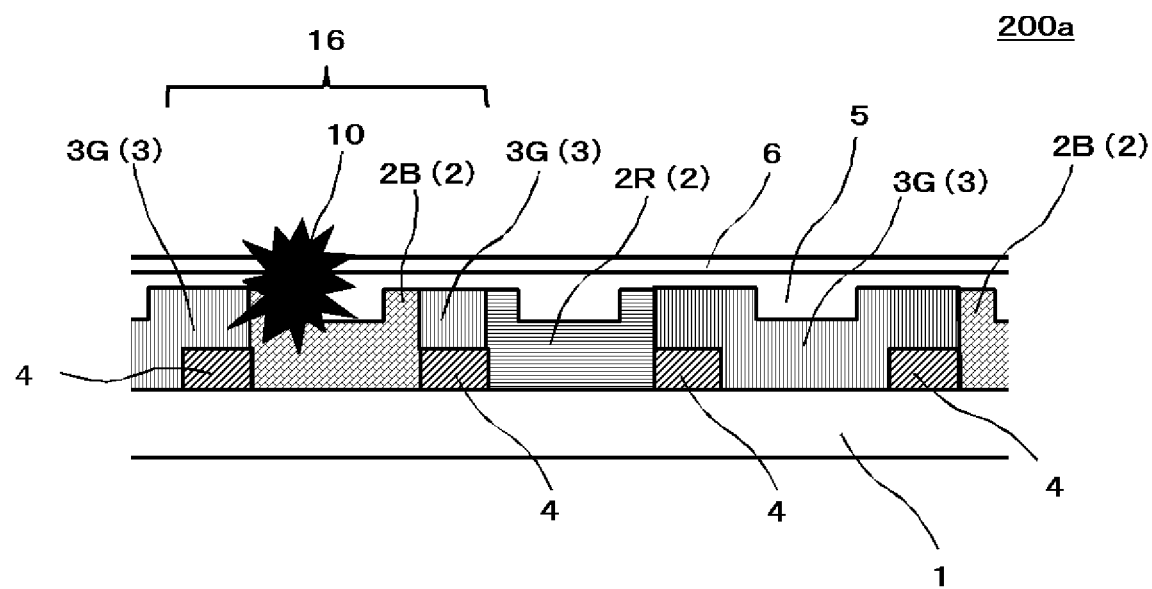
FIG. 9 is a sectional view illustrating a CF substrate of a liquid crystal display panel of a first embodiment of this disclosure.

Thirdly, a description will be provided for a configuration when the CF substrate 100a of the liquid crystal display panel 100b of the first embodiment of this disclosure has a bright-spot-defective pixel part 16. FIG. 9 is a sectional view illustrating a CF substrate 200a of the liquid crystal display panel of the first embodiment of this disclosure.

FIG. 9 is a view corresponding to a state where a bright spot defect occurs in a part of the pixel of FIG. 2. In FIG. 9, in manufacturing and the like of the CF substrate 200a, impurities 10 are mixed and a bright spot defect occurs in one pixel of the blue material film 23, thereby it becomes the bright-spot-defective pixel part 16. Since the CF substrate 200a illustrated in FIG. 9 has a configuration similar to that of FIG. 2, except that the CF substrate 200a has the bright-spot-defective pixel part 16 due to the bright spot defect occurring in one pixel of the blue material film 2B, a description thereof is omitted.

Hereinafter, a description will be provided for an example of a mechanism in which a bright spot defect occurs in a CF substrate. In a CF substrate manufacturing process, when the impurities 10 are mixed into a substrate surface and the like, various defects occur. Therefore, in the CF substrate manufacturing process in which a photoengraving process is a first process, it is manufactured in so-called a "clean room" in which the impurities 10 are excluded as much as possible. However, for example, fine impurities 10 generated from a manufacturing apparatus may be mixed into the CF substrate surface and the like.

As illustrated in FIG. 9, if the impurities 10 are mixed into films and the like of the color material film 2 and the overcoat film 5, when the TFT array substrate 13 and the CF substrate 200a are bonded with each other to obtain a liquid crystal display panel, an electrical conductive path is generated through the impurities 10 between an electrode of the ITT array substrate 13 and the opposite electrode 6 of the CF substrate 200a, so that an always-shining bright spot defect occurs in many cases.

Fourthly, a description will be provided for a configuration in which blackening spot repair is performed when a bright spot defect occurs in the CF substrate 100a of the liquid crystal display panel 100b of the first embodiment of this disclosure.

Figure 14:
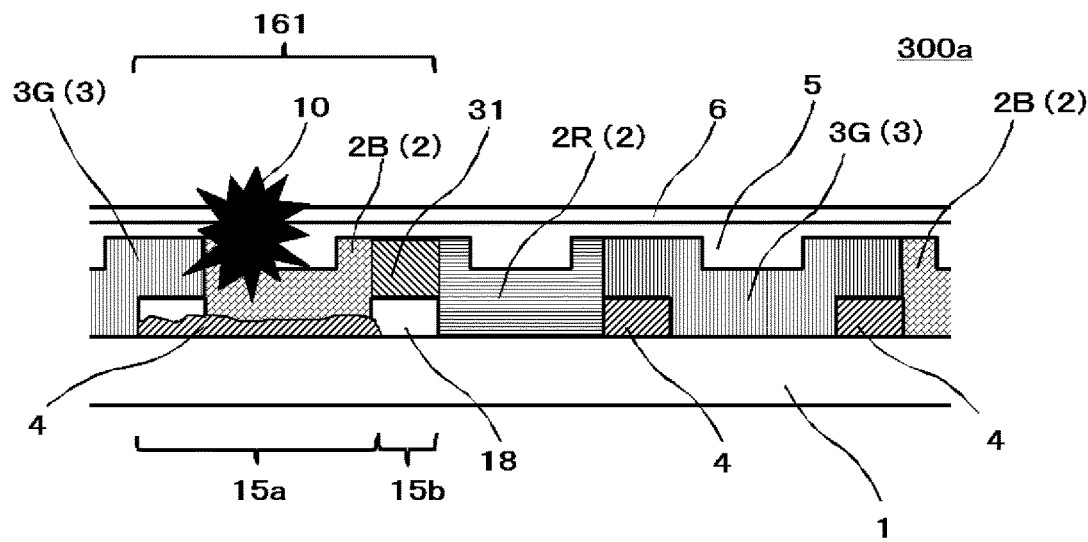
FIG. 14 is a sectional view illustrating a CF substrate of the liquid crystal display panel of the first embodiment of this disclosure.

FIG. 14 is a sectional view illustrating a CF substrate 300a of the liquid crystal display panel of the first embodiment of this disclosure. FIG. 14 is a view corresponding to a state where a blackening-spot-repair pixel part 161 is obtained by performing blackening spot repair on the bright-spot-defective pixel part 16 of FIG. 9.

In FIG. 14, in a blackening-spot-repair light blocking portion 15a of the blackening-spot-repair pixel part 161, the black matrix film 4 is diffused to a gap 17 below the blue material film 2B and extends to block light. Furthermore, in a blackening-spot-repair light blocking portion 15b, the black matrix film 4 is discharged and then a cavity 18 is generated, hut the green repair color material film 3G is blackened, serves as a repair color material film 31 to block light, and light is blocked in the entire blackening-spot-repair pixel part 161. Since the other configuration is similar to that of FIG. 9, a description thereof is omitted.

Fifthly, a description will be provided for a bright spot defect correction method, in which blackening spot repair is performed on the CF substrate 200a of the liquid crystal display panel of the first embodiment of this disclosure and the CF substrate 300a of the liquid crystal display panel is manufactured. FIGS. 10 to 13 are sectional views illustrating a part of the bright spot defect correction method of the CF substrate 200a of the liquid crystal display panel of the first embodiment of this disclosure.

Figure 10:
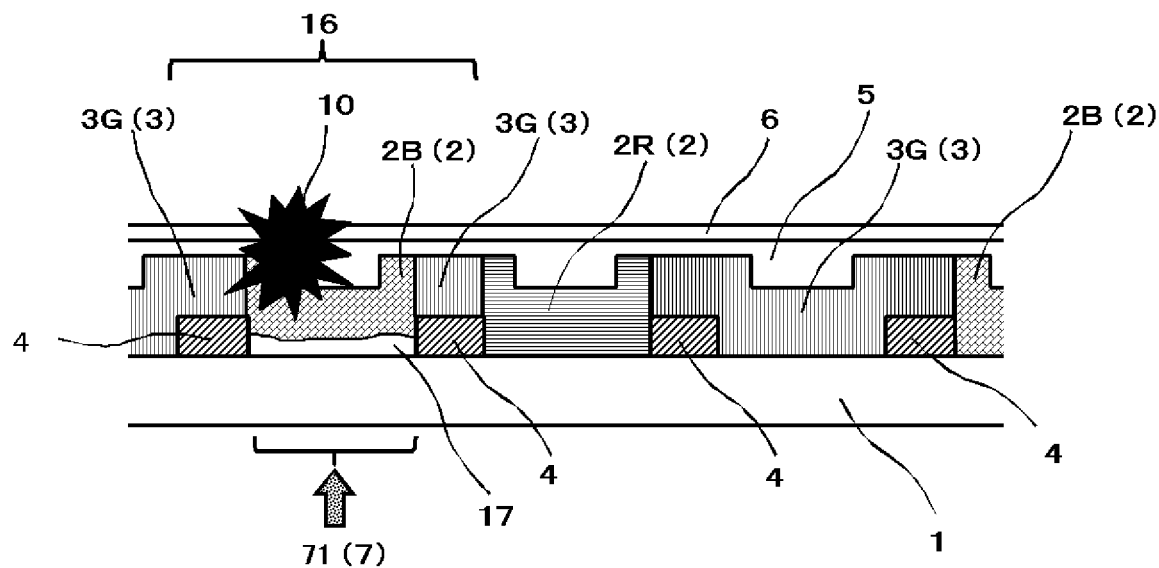
FIG. 10 is a sectional view illustrating a part of a bright spot defect correction method of the CF substrate of the liquid crystal display panel of the first embodiment of this disclosure.

FIG. 10 is a sectional view for explaining that the gap 17 is formed between the blue material film 2B of the bright-spot-defective pixel part 16 and the glass substrate 1. In FIG. 10, first laser light 71 formed in a size smaller than a width of the blue material film 2B by using a slit and the like scans and is irradiated to the entire surface of the blue material film 2B of the bright-spot-defective pixel part 16 toward the blue material film 2B by passing through the glass substrate 1 from the glass substrate (1) side. By the first laser light 71, the gap 17 is formed between the blue material film 2B and the glass substrate 1 as illustrated in FIG. 10.

As the first laser light 71, for example, YAG (Yttrium Aluminum Garnet) laser, which is visible laser, is used. When a wavelength easy to be absorbed in the color material film 2 is used as the wavelength of the first laser light 71, efficiency of forming the gap 17 of the repair color material film 2 becomes high and thus productivity is improved. In the case of the blue material film 2B, 500 nm to 750 nm are preferable, and for example, a wavelength 532 nm of a YAG second harmonic is used.

Figure 11:
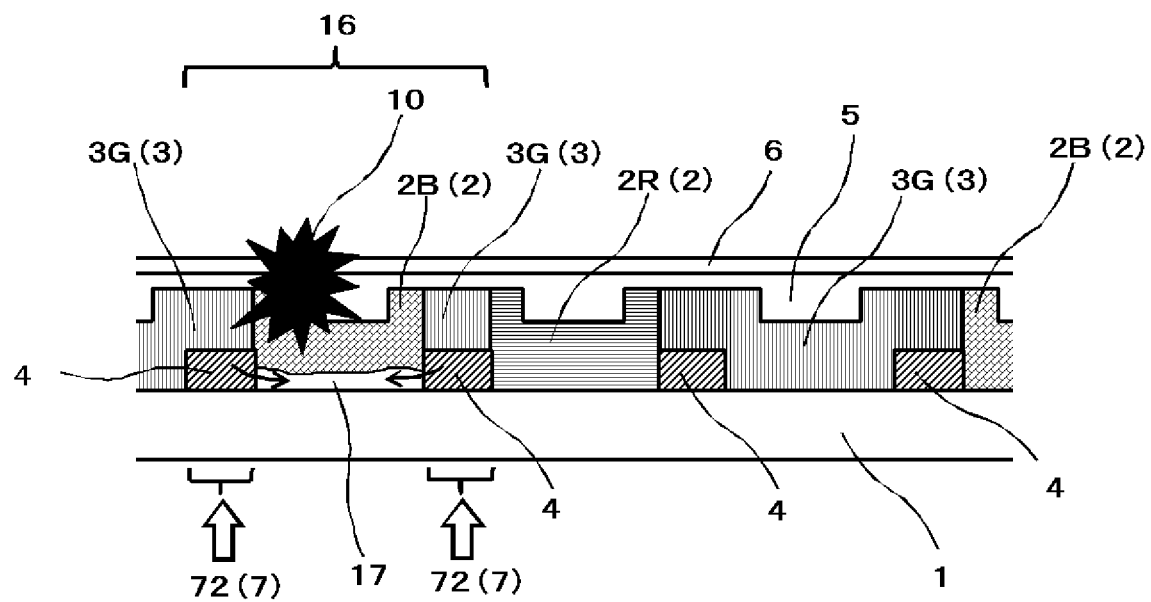
FIG. 11 is a sectional view illustrating a part of the bright spot defect correction method of the CF substrate of the liquid crystal display panel of the first embodiment of this disclosure.

FIG. 11 is a sectional view for explaining that second laser light (black matrix film fluidization laser light) 72 is irradiated to the black matrix film 4 of the bright-spot-defective pixel part 16 and the fluidized black matrix film 4 is diffused toward the gap 17. In FIG. 11, the second laser light 72 formed in a size smaller than a width of the black matrix film 4 by using a slit and the like scans and is irradiated to the black matrix film 4 of the bright-spot-defective pixel part 16 toward the black matrix film 4 by passing through the glass substrate 1 from the glass substrate (1) side. The black matrix film 4 irradiated with the second laser light 72 is diffused to move to the gap 17.

Figure 12:
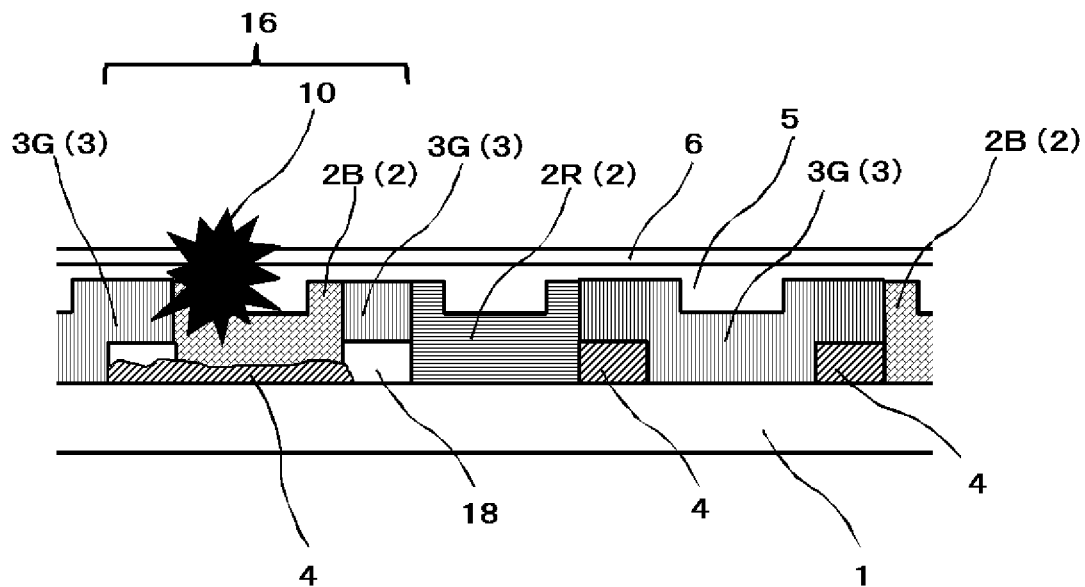
FIG. 12 is a sectional view illustrating a part of the bright spot defect correction method of the CF substrate of the liquid crystal display panel of the first embodiment of this disclosure.

As the second laser light 72, for example, YAG (Yttrium Aluminum Garnet) laser (visible laser) is used. As a wavelength of the second laser light 72, a wavelength 532 nm of the YAG second harmonic is used for example, FIG. 12 is a sectional view for explaining that the black matrix film 4 is diffused into the gap 17. In FIG. 12, the fluidized black matrix film 4 is diffused into the gap 17 between the blue material film 2B of the bright-spot-defective pixel part 16 and the glass substrate 1, so that the moved black matrix film 4 blocks the bright-spot-defective pixel part 16 from light in the blackening-spot-repair light blocking portion 15a.

As illustrated in FIG. 12, at a position in which the black matrix film 4 has been originally formed before the second laser light 72 is irradiated, since the black matrix film 4 may partially become excessively thin or may not partially exist, a cavity 18 is generated.

Figure 13:
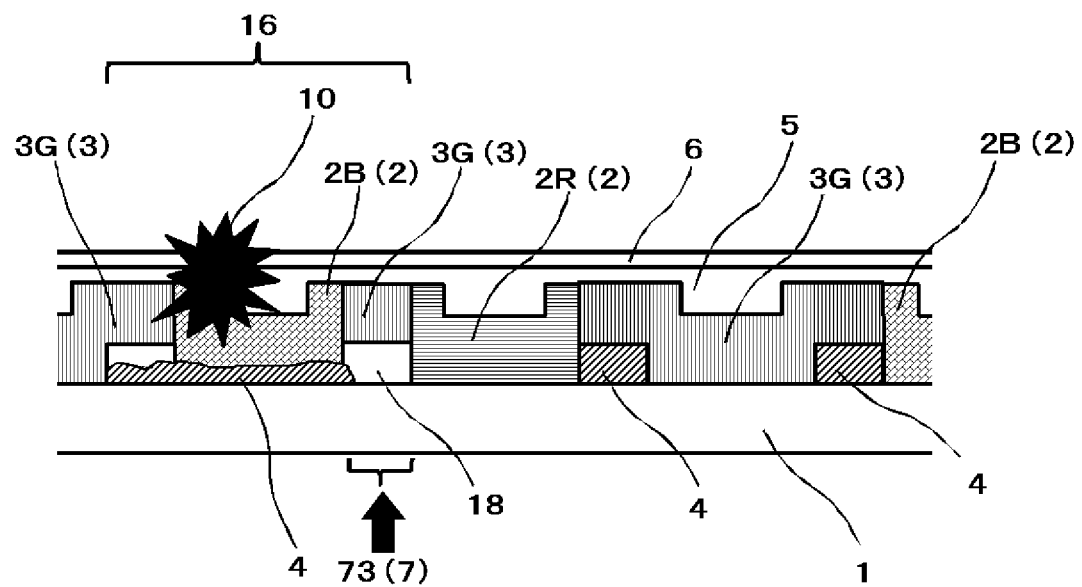
FIG. 13 is a sectional view illustrating a part of the bright spot defect correction method of the CF substrate of the liquid crystal display panel of the first embodiment of this disclosure.

FIG. 13 is a sectional view for explaining that third laser light (repair color material film blackening laser light) 73 is irradiated to the green repair color material film 3G to blacken the green repair color material film 3G. In FIG. 13, the third laser light 73 formed in a size smaller than a width of the green repair color material film 3G by using a slit and the like scans and is irradiated to the green repair color material film 3G on the cavity 18, which is generated by the movement of the black matrix film 4, toward the green repair color material film 3G by passing through the glass substrate 1 from the glass substrate (1) side.

As the third laser light 73, irradiation is performed using visible laser for example. When a wavelength easy to be absorbed in the repair color material film 3 is used as the wavelength of the third laser light 73, blackening efficiency of the repair color material film 3 becomes high and thus productivity is improved. Since the repair color material film 3 of the first embodiment of this disclosure is the green repair color material film 3G, the wavelength of the third laser light 73 uses 400 nm to 480 nm or 600 nm to 750 nm for example.

The third laser light 73 scans and is irradiated to the green repair color material film 3G, so that the green repair color material film 3G is blackened to serve as the repair color material film 31, light is blocked in the blackening-spot-repair light blocking portion 15b, and thus the CF substrate 300a of the liquid crystal display panel illustrated in FIG. 14 is obtained.

In FIG. 14, in the CF substrate 300a of the liquid crystal display panel, the entire blackening-spot-repair pixel part 161 is blocked from light by the blackening-spot-repair light blocking portion 15a and the blackening-spot-repair light blocking portion 15b, so that the bright-spot-defective pixel part 16 becomes the blackening-spot-repair pixel part 161 through blackening spot repair.

In the process of FIG. 11, when the diffused black matrix film 4 sufficiently covers the entire bright-spot-defective pixel part 16 and light is blocked, the irradiation of the third laser light 73 in the process of FIG. 13 may not be performed.

The color filter substrate, the display panel, and the display apparatus of the first embodiment of this disclosure include the transparent glass substrate 1, and the black matrix film 4, the color material film 2, and the repair color material film 3 formed on the glass substrate 1, and in the display region, since the repair color material film 3 is formed on the upper surface of the black matrix film 4 in at least a part overlapping the black matrix film 4 in a plan view, even though the bright-spot-defective pixel part 16 occurs, it is possible to reduce light leakage in a case where the bright-spot-defective pixel part 16 is subjected to blackening spot repair.

In the color filter substrate, the display panel, and the display apparatus of the first embodiment of this disclosure, since the repair color material film 3 is directly formed on the black matrix film 4, even though the bright-spot-defective pixel part 16 occurs, it is possible to reduce light leakage in a case where the bright-spot-defective pixel part 16 is subjected to blackening spot repair.

In the color filter substrate, the display panel, and the display apparatus of the first embodiment of this disclosure, since the black matrix film 4 is directly formed on the glass substrate 1, even though the bright-spot-defective pixel part 16 occurs, it is possible to reduce light leakage in a case where the bright-spot-defective pixel part 16 is subjected to blackening spot repair.

In the color filter substrate, the display panel, and the display apparatus of the first embodiment of this disclosure, since the repair color material film 3 is the green repair color material film 3G, even though the bright-spot-defective pixel part 16 occurs, it is possible to reduce light leakage in a case where the bright-spot-defective pixel part 16 is subjected to blackening spot repair.

In the color filter substrate, the display panel, and the display apparatus of the first embodiment of this disclosure, transmittance of visible light of the repair color material film 3, which is at least a part of the bright-spot-defective pixel part 16 having a bright spot defect, is reduced as compared with the repair color material film 3 of a normal pixel part, and the bright-spot-defective pixel part 161 is blocked from light by any one or both of the black matrix film 4 and the repair color material film 31 with reduced transmittance, so that it is possible to reduce light leakage in a case where the bright-spot-defective pixel part 16 is subjected to blackening spot repair.

Each of the manufacturing method of the color filter substrate and the manufacturing method of the display panel of the first embodiment of this disclosure includes forming the black matrix film 4 on a transparent substrate, forming the color material film 2, and forming the repair color material film 3 in at least a part overlapping the black matrix film in a plan view in a display region. Therefore, even though the bright-spot-defective pixel part 16 occurs, it is possible to reduce light leakage in a case where the bright-spot-defective pixel part 16 is subjected to blackening spot repair even though the bright-spot-defective pixel part 16 occurs.

In the manufacturing method of the color filter substrate and the manufacturing method of the display panel of the first embodiment of this disclosure, after the forming the black matrix film 4, forming the repair color material film 3 is performed to contact with an upper surface of the black matrix film 4, and after the forming the repair color material film 3, forming the color material film 2 is performed. Therefore, even though the bright-spot-defective pixel part 16 occurs, it is possible to reduce light leakage in a case where the bright-spot-defective pixel part 16 is subjected to blackening spot repair.

In the manufacturing method of the color filter substrate and the manufacturing method of the display panel of the first embodiment of this disclosure, in the forming the black matrix film 4, since the black matrix film 4 is directly formed on the substrate 1, even though the bright-spot-defective pixel part 16 occurs, it is possible to reduce light leakage in a case where the bright-spot-defective pixel part 16 is subjected to blackening spot repair.

In the manufacturing method of the color filter substrate and the manufacturing method of the display panel of the first embodiment of this disclosure, since the repair color material film 3 is the green repair color material film 3G, even though the bright-spot-defective pixel part 16 occurs, it is possible to reduce light leakage in a case where the bright-spot-defective pixel part 16 is subjected to blackening spot repair.

According to the bright spot defect correction method of the display panel of the first embodiment of this disclosure, the second laser light (the black matrix film fluidization laser light) 72 is irradiated to the black matrix film 4 corresponding to the bright-spot-defective pixel part 16 having a bright spot defect, so that the black matrix film 4 is diffused to the region of the bright-spot-defective pixel part 16, and the third laser light (repair color material film blackening laser light) 73 is irradiated to the repair color material film 3 corresponding to the bright-spot-defective pixel part 16, so that the repair color material film 3 is blackened to reduce transmittance. Consequently, it is possible to reduce light leakage in a case where the bright-spot-defective pixel part 16 is subjected to blackening spot repair.

According to the bright spot defect correction method of the display panel of the first embodiment of this disclosure, since the repair color material film 3 is the green repair color material film 3G, even though the bright-spot-defective pixel part 16 occurs, it is possible to reduce light leakage in a case where the bright-spot-defective pixel part 16 is subjected to blackening spot repair.

In the first embodiment of this disclosure, the example of the green repair color material film 3G as the repair color material film 3 is described; however, the repair color material film 3 of other colors may be used if it is easily blackened through laser light irradiation. Even in the case of using the repair color material film 3 of other colors to be easily blackened, it is possible to achieve effects similar to the case of using the green repair color material film 3G in the first embodiment of this disclosure.

In the first embodiment of this disclosure, the example of the green repair color material film 3G as the repair color material film 3 and the red material film 2R and the blue material film 2B as the color material film 2, that is, the example of total three colors is described; however, total two colors or more may be used inclusive the repair color material film 3, so that similar effects are achieved.

In the first embodiment of this disclosure, the example, in which the repair color material film 3 is also formed in the pixel opening 14; however, instead of forming the repair color material film 3 in the pixel opening 14, the repair color material film 3 may be formed so as to contact with the upper surface of the black matrix film 4 in only a part overlapping the black matrix film 4 in a plan view, so that similar effects are achieved.

In the first embodiment of this disclosure, the glass substrate 1 is used as an example of a transparent substrate; however, a resin substrate such as a plastic may be used, so that similar effects are achieved. Particularly, a substrate with high transmittance in a wavelength range of laser light is more preferable because it achieves high efficiency of formation of the gap 17 between the color material film 2 and the substrate, fluidization of the black matrix film 4 and diffusion thereof to the gap 17, and blackening of the repair color material film 3 due to laser light.

In the first embodiment of this disclosure, the ITO as an example of the opposite electrode 6 is described; however, the opposite electrode 6 is not limited to the ITO as far as it is a transparent conductive material. For example, materials obtained by converting an IZO, an ITZO, and an oxide semiconductor (InGaZnO and the like) into a conductor may be used. Even though these are used, it is possible to achieve effects similar to the case of using the ITO in the first embodiment of this disclosure.

In the first embodiment of this disclosure, the example of the liquid crystal display panel and the liquid crystal display apparatus is described; however, other display panels and display apparatuses using a color filter may be used, so that similar effects are achieved.

Second Embodiment

A CF substrate 101a of a second embodiment of this disclosure is different from the first embodiment of this disclosure in that the repair color material film 3 is directly formed under the black matrix film 4.

Figure 15:
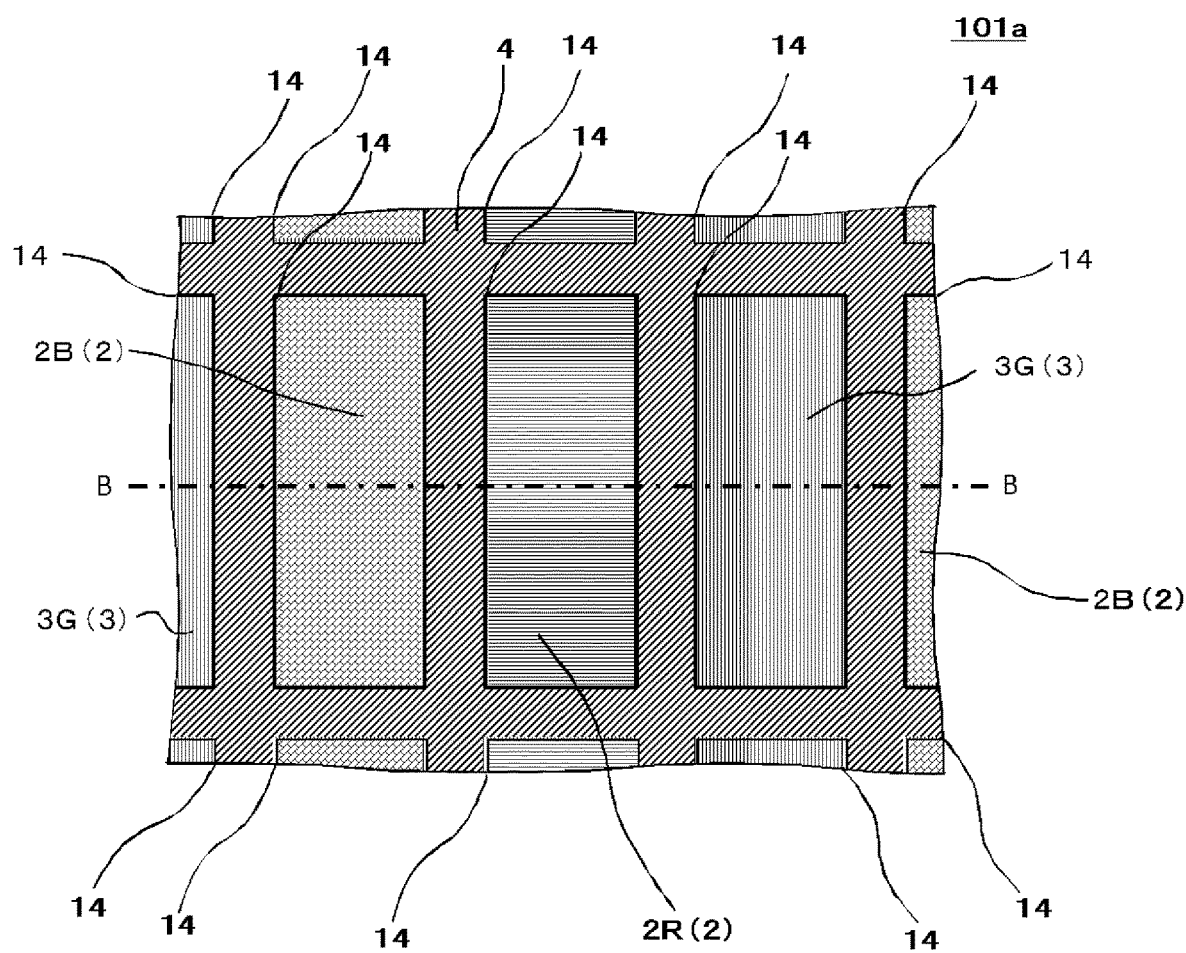
FIG. 15 is a top plan view illustrating a CF substrate of a second embodiment of this disclosure.

Firstly, a configuration of the CF substrate 101a serving as a color filter substrate of the second embodiment of this disclosure will be described. FIG. 15 is a top plan view illustrating the CF substrate 101a of the second embodiment of this disclosure.

Figure 16:
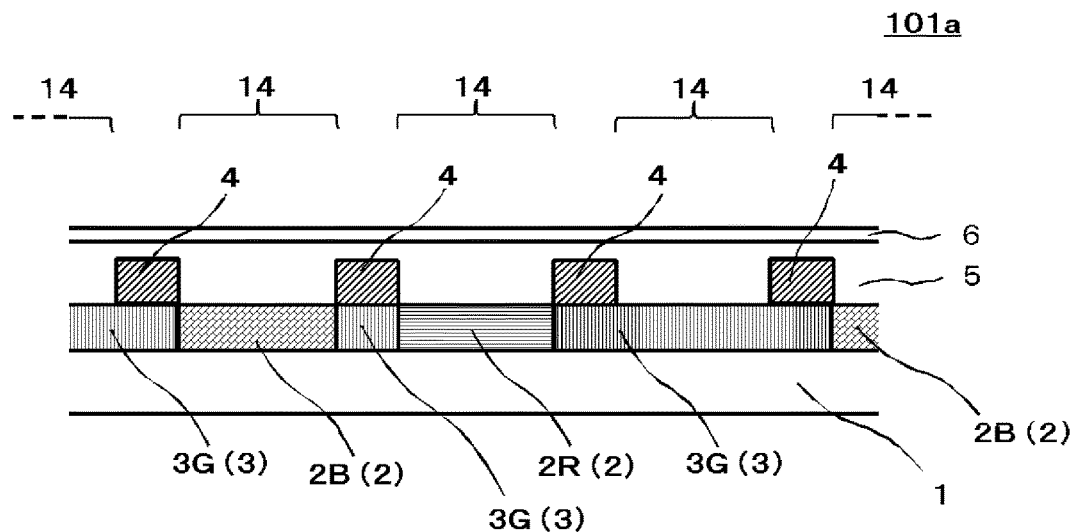
FIG. 16 is a sectional view illustrating the CF substrate of the second embodiment of this disclosure.

FIG. 16 is a sectional view illustrating the CF substrate 101a of the second embodiment of this disclosure. FIG. 16 illustrates a section B-B in FIG. 15. With respect to FIGS. 15 and 16, the same or corresponding parts described with reference to FIGS. 1 and 2 are denoted by the same reference numerals, and a description thereof is omitted.

In FIG. 16, in the display region, the repair color material film 3G is directly formed on a lower surface of the black matrix film 4 in at least a part overlapping the black matrix film 4 in a plan view.

Secondly, a manufacturing method of the CF substrate 101a of the second embodiment of this disclosure will be described. FIGS. 17 to 21 are sectionals views illustrating a part of the manufacturing process of the CF substrate 101a of the second embodiment of this disclosure.

Figure 17:
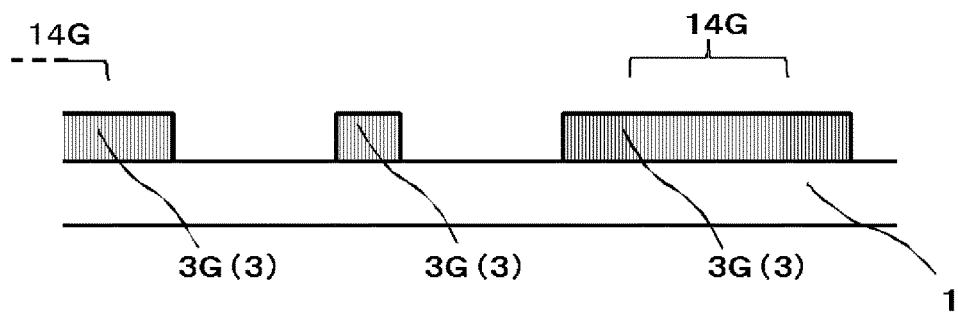
FIG. 17 is a sectional view illustrating a part of a manufacturing process of the CF substrate of the second embodiment of this disclosure.

First, the green repair color material film 3G is formed on the glass substrate 1, which is a transparent substrate, in at least a predetermined part overlapping the black matrix film 4 in a plan view in the display region. Simultaneously, the green repair color material film 3G is also formed in the green pixel opening 14G (FIG. 17).

Figure 18:
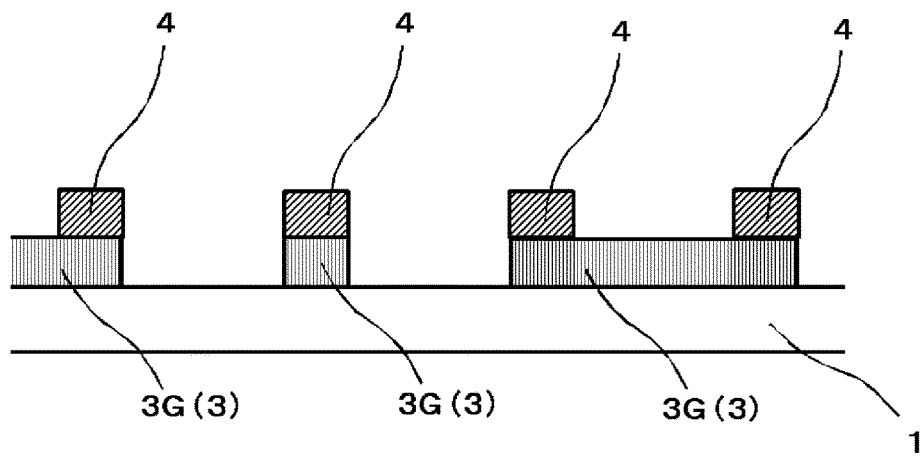
FIG. 18 is a sectional view illustrating a part of the manufacturing process of the CF substrate of the second embodiment of this disclosure.
Figure 19:
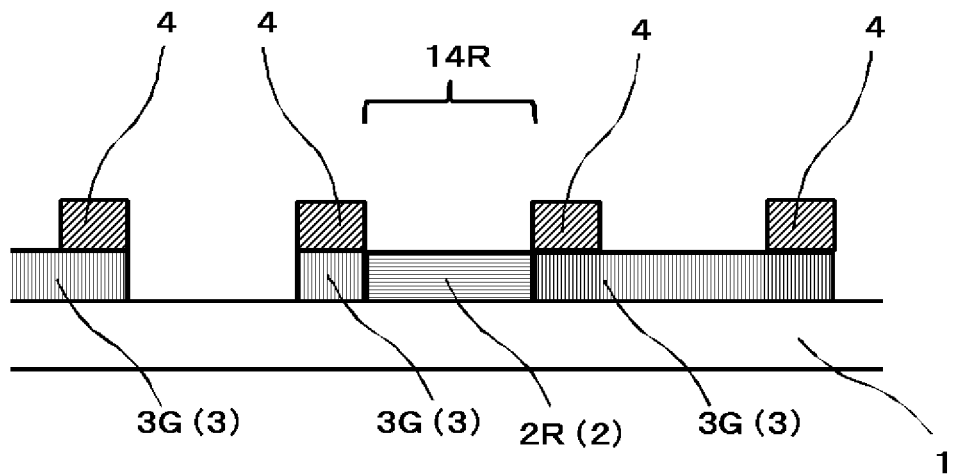
FIG. 19 is a sectional view illustrating a part of the manufacturing process of the CF substrate of the second embodiment of this disclosure.
Figure 20:
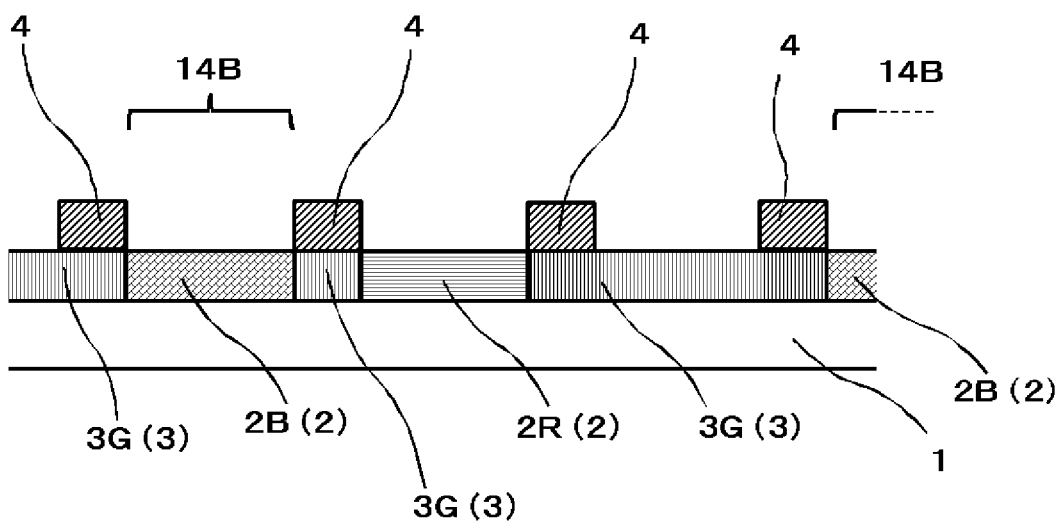
FIG. 20 is a sectional view illustrating a part of the manufacturing process of the CF substrate of the second embodiment of this disclosure.
Figure 21:
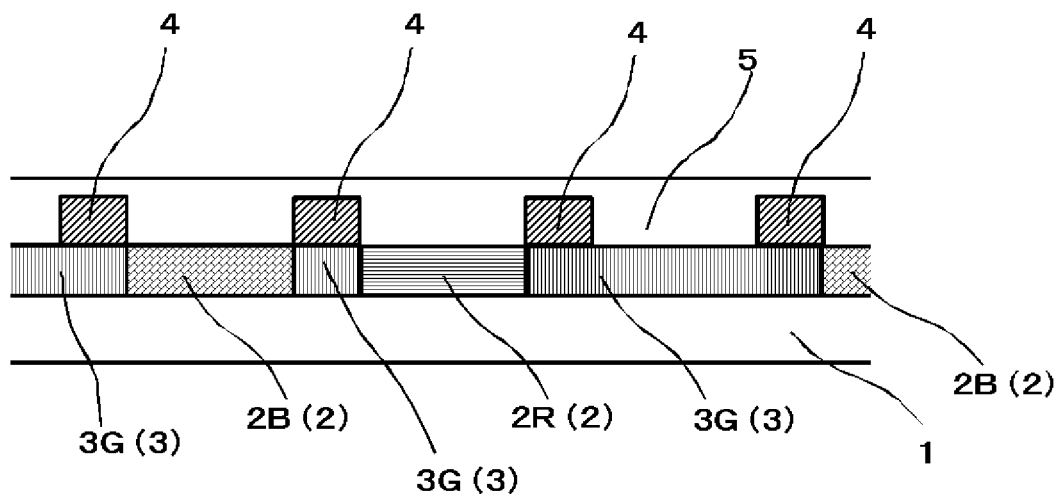
FIG. 21 is a sectional view illustrating a part of the manufacturing process of the CF substrate of the second embodiment of this disclosure.

After the forming the green repair color material film 3G, the black matrix film 4 is formed such that the green repair color material film 3G contacts with the lower surface of the black matrix film 4, and the lower surface of the black matrix film 4 and the repair color material film 3G are allowed to contact with each other in at least a part overlapping the black matrix film 4 in a plan view in the display region (FIG. 18). Next, the red material film 2R (the color material film 2) is formed in the red pixel opening 14R (FIG. 19). Next, the blue material film 2B (the color material film 2) is formed in the blue pixel opening 14B (FIG. 20). Since the followings are similar to those of the first embodiment, a description thereof is omitted. In this way, the CF substrate 101a illustrated in FIGS. 15 and 16 is obtained.

Figure 22:
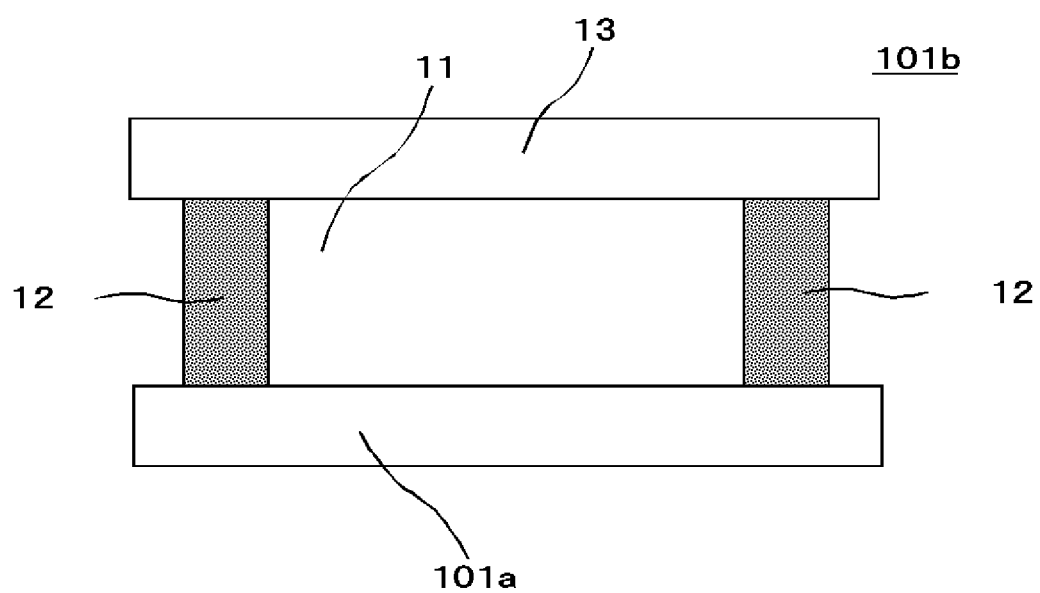
FIG. 22 is a sectional view illustrating a liquid crystal display panel of the second embodiment of this disclosure.

FIG. 22 is a sectional view illustrating a liquid crystal display panel 101b of the second embodiment of this disclosure. As illustrated in FIG. 22, the TFT array substrate 13 and the CF substrate 101a are bonded with each other, so that the liquid crystal display panel 101b serving as a display panel is obtained. Moreover, the liquid crystal display panel 101*b* is assembled in a mounting process to serve as a liquid crystal display apparatus.

Figure 23:
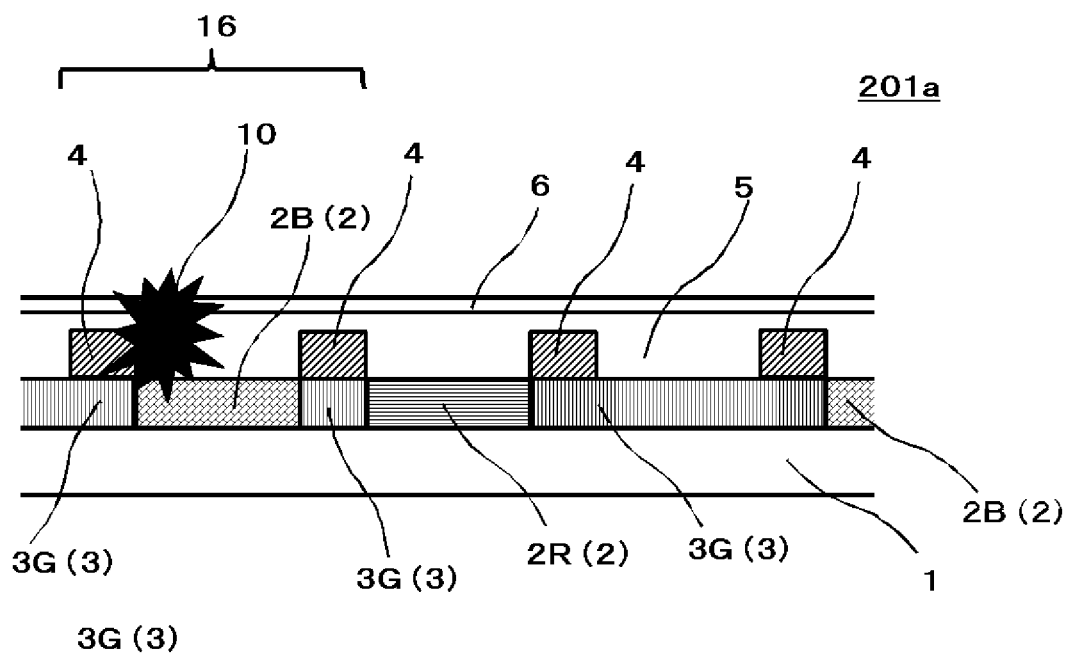
FIG. 23 is a sectional view illustrating a CF substrate of the liquid crystal display panel of the second embodiment of this disclosure.

Thirdly, a description will be provided for a configuration when the CF substrate 101*a* of the liquid crystal display panel 101*b* of the second embodiment of this disclosure has the bright-spot-defective pixel part 16. FIG. 23 is a sectional view illustrating a CF substrate 201*a* of the liquid crystal display panel of the second embodiment of this disclosure.

FIG. 23 is a view corresponding to a state where a bright spot defect occurs in a part of the pixel of FIG. 16. In FIG. 23, in manufacturing and the like of the CF substrate 201*a*, impurities 10 are mixed and a bright spot defect occurs in one pixel of the blue material film 2B, thereby it becomes the bright-spot-defective pixel part 16. Since the CF substrate 201*a* illustrated in FIG. 23 has a configuration similar to that of FIG. 16, except that the CF substrate 201*a* has the bright-spot-defective pixel part 16 due to the bright spot defect occurring in one pixel of the blue material film 2B, a description thereof is omitted.

Hereinafter, a description will be provided for an example of a mechanism in which a bright spot detect occurs in a CF substrate. In a CF substrate manufacturing process, when the impurities 10 are mixed into a substrate surface and the like, various defects occur. However, for example, fine impurities 10 generated from a manufacturing apparatus may be mixed into the CF substrate surface and the like.

As illustrated in FIG. 23, if the impurities 10 are mixed into films and the like of the color material film 2 and the overcoat film 5, when the TFT array substrate 13 and the CF substrate 201*a* are bonded with each other to obtain a liquid crystal display panel, an electrical conductive path is generated through the impurities 10 between an electrode of the TFT array substrate 13 and the opposite electrode 6 of the CF substrate 201*a*, so that an always-shining bright spot defect occurs in many cases.

Fourthly, a description will be provided for a configuration in which blackening spot repair is performed when a bright spot defect occurs in the CF substrate 101*a* of the liquid crystal display panel 101*b* of the second embodiment of this disclosure.

Figure 26:
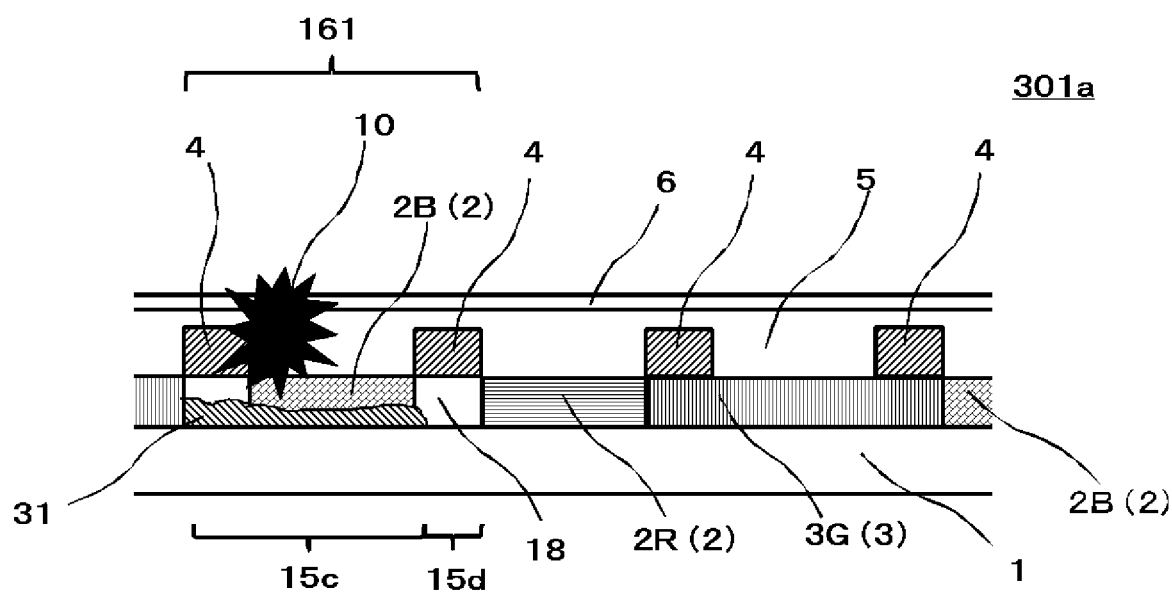
FIG. 26 is a sectional view illustrating a CF substrate of the liquid crystal display panel of the second embodiment of this disclosure.

FIG. 26 is a sectional view illustrating a CF substrate 301*a* of the liquid crystal display panel of the second embodiment of this disclosure. FIG. 26 is a view corresponding to a state where the blackening-spot-repair pixel part 161 is obtained by performing blackening spot repair on the bright-spot-defective pixel part 16 of FIG. 23. In FIG. 26, in a blackening-spot-repair light blocking portion 15*c* of the blackening-spot-repair pixel part 161, a blackened repair color material film 31 is diffused to the gap 17 below the blue material film 2B and extends to block light. Furthermore, in a light blocking portion 15*d*, the black matrix film 4 blocks light, so that light is blocked in the entire blackening-spot-repair pixel part 161. Since the other configuration is similar to that of FIG. 23, a description thereof is omitted.

Figure 24:
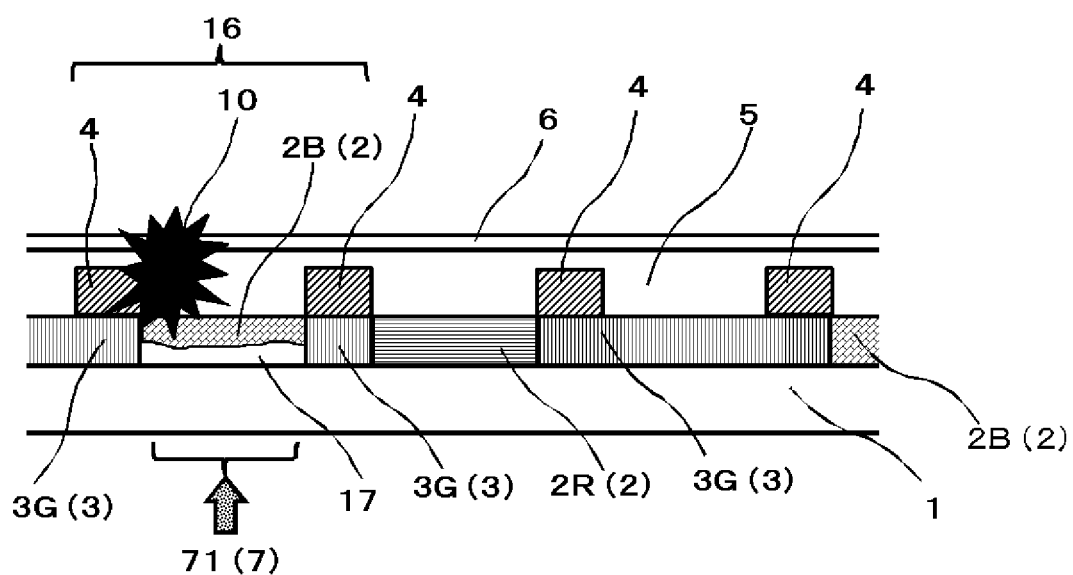
FIG. 24 is a sectional view illustrating a part of a bright spot defect correction method of the CF substrate of the liquid crystal display panel of the second embodiment of this disclosure.
Figure 25:
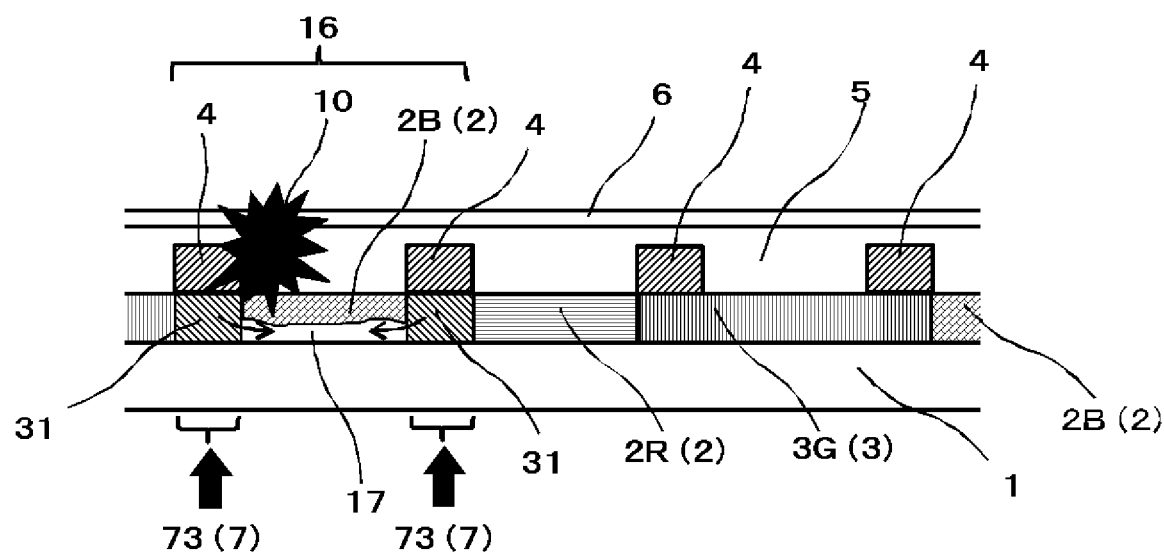
FIG. 25 is a sectional view illustrating a part of the bright spot defect correction method of the CF substrate of the liquid crystal display panel of the second embodiment of this disclosure.

Fifthly, a description will be provided for a bright spot defect correction method in which blackening spot repair is performed on the CF substrate 201*a* of the liquid crystal display panel of the second embodiment of this disclosure and the CF substrate 301*a* of the liquid crystal display panel is manufactured. FIGS. 24 and 25 are sectional views illustrating a part of the bright spot defect correction method of the CF substrate 201*a* of the liquid crystal display panel of the second embodiment of this disclosure.

FIG. 24 is a sectional view for explaining that the gap 17 is formed between the blue material film 2B of the bright-spot-defective pixel part 16 and the glass substrate 1. In FIG. 24, the first laser light 71 formed in a size smaller than a width of the blue material film 29 by using a slit and the like scans and is irradiated to the entire surface of the blue material film 2B of the bright-spot-defective pixel part 16 toward the blue material film 2B by passing through the glass substrate 1 from the glass substrate (1) side. By the first laser light 71, the gap 17 is formed between the blue material film 21B and the glass substrate 1 as illustrated in FIG. 24. Since the irradiation conditions of the first laser light 71 are described in the first embodiment of this disclosure, a description thereof is omitted.

FIG. 25 is a sectional view for explaining that the third laser light (repair color material film blackening laser light) 73 is irradiated to the green repair color material film 3G of the bright-spot-defective pixel part 16 to obtain a blackened repair color material film 31, and the blackened repair color material film 31 is fluidized and is diffused toward the gap 17.

In FIG. 25, the third laser light 73 formed in a size smaller than a pattern width of the green repair color material film 3G by using a slit and the like scans and is irradiated to the green repair color material film 3G of the bright-spot-defective pixel part 16 toward the green repair color material film 3G by passing through the glass substrate 1 from the glass substrate (1) side.

The third laser light 73 is irradiated, the green repair color material film 3G is blackened to serve as the repair color material film 31, and the further diffused repair color material film 31 is moved to the gap 17. The fluidized repair color material film 31 is diffused into the gap 17 between the blue material film 2B of the bright-spot-defective pixel part 16 and the glass substrate 1, so that the moved repair color material film 31 blocks the blackening-spot-repair pixel part 161 from light in the blackening-spot-repair light blocking portion 15*c* as illustrated in FIG. 26. As a consequence, the CF substrate 301*a* of the liquid crystal display panel is obtained. Since the irradiation conditions of the third laser light 73 are described in the first embodiment of this disclosure, a description thereof is omitted.

As illustrated in FIG. 26, at a position in which the green repair color material film 3G has been originally formed before the third laser light 73 is irradiated, since the blackened repair color material film 31 may partially become excessively thin or may not partially exist, the cavity 18 is generated.

Even though such a cavity 18 is generated, since there is the black matrix film 4 above the cavity 18, light is blocked in the light blocking portion 15*d* in the configuration of the second embodiment of this disclosure. In the CF substrate 301*a* of the liquid crystal display panel, the entire blackening-spot-repair pixel part 161 is blocked from light by the blackening-spot-repair light blocking portion 15*c* and the light blocking portion 15*d*, so that the bright-spot-defective pixel part 16 becomes the blackening-spot-repair pixel part 161 through blackening spot repair.

The color filter substrate, the display panel, and the display apparatus of the second embodiment of this disclosure include the transparent glass substrate 1, and the black matrix film 4, the color material film 2, and the repair color material film 3 formed on the glass substrate 1, and in the display region, since the repair color material film 3 is formed on the lower surface of the black matrix film 4 in at least a part overlapping the black matrix film 4 in a plan view, even though the bright-spot-defective pixel part 16 occurs, it is possible to reduce light leakage in a case where the bright-spot-defective pixel part 16 is subjected to blackening spot repair.

In the color filter substrate, the display panel, and the display apparatus of the second embodiment of this disclosure, since the repair color material film 3 is directly formed below the black matrix film 4, even though the bright-spot-defective pixel part 16 occurs, it is possible to reduce light leakage in a case where the bright-spot-defective pixel part 16 is subjected to blackening spot repair.

In the color filter substrate, the display panel, and the display apparatus of the second embodiment of this disclosure, since the repair color material film 3 is directly formed on the glass substrate 1, even though the bright-spot-defective pixel part 16 occurs, it is possible to reduce light leakage in a case where the bright-spot-defective pixel part 16 is subjected to blackening spot repair.

In the manufacturing method of the color filter substrate and the manufacturing method of the display panel of the second embodiment of this disclosure, after forming the repair color material film 3, forming the black matrix film 4 is performed such that the repair color material film 3 contacts with the lower surface of the black matrix film 4, and after forming the black matrix film 4, forming the color material film 2 is performed. Therefore, even though the bright-spot-defective pixel part 16 occurs, it is possible to provide the display apparatus that reduces light leakage in a case where the bright-spot-defective pixel part 16 is subjected to blackening spot repair In the manufacturing method of the color filter substrate and the manufacturing method of the display panel of the second embodiment of this disclosure, in the forming the repair color material film 3, the repair color material film 3 is directly formed on the glass substrate 1. Therefore, even though the bright-spot-defective pixel part 16 occurs, it is possible to provide the display apparatus that reduces light leakage in a case where the bright-spot-defective pixel part 16 is subjected to blackening spot repair.

According to the bright spot defect correction method of the display panel of the second embodiment of this disclosure, the third laser light 73 is irradiated toward the repair color material film 3 corresponding to the bright-spot-defective pixel part 16 having a bright spot defect so as to blacken the repair color material film 3 and to reduce transmittance, and the blackened repair color material film 3 is diffused to the region of the bright-spot-defective pixel part 16. Therefore, it is possible to provide the display apparatus that reduces light leakage in a case where the bright-spot-defective pixel part 16 is subjected to blackening spot repair.

A CF substrate 102*a* of a modification example of the second embodiment of this disclosure will be described.

Figure 27:
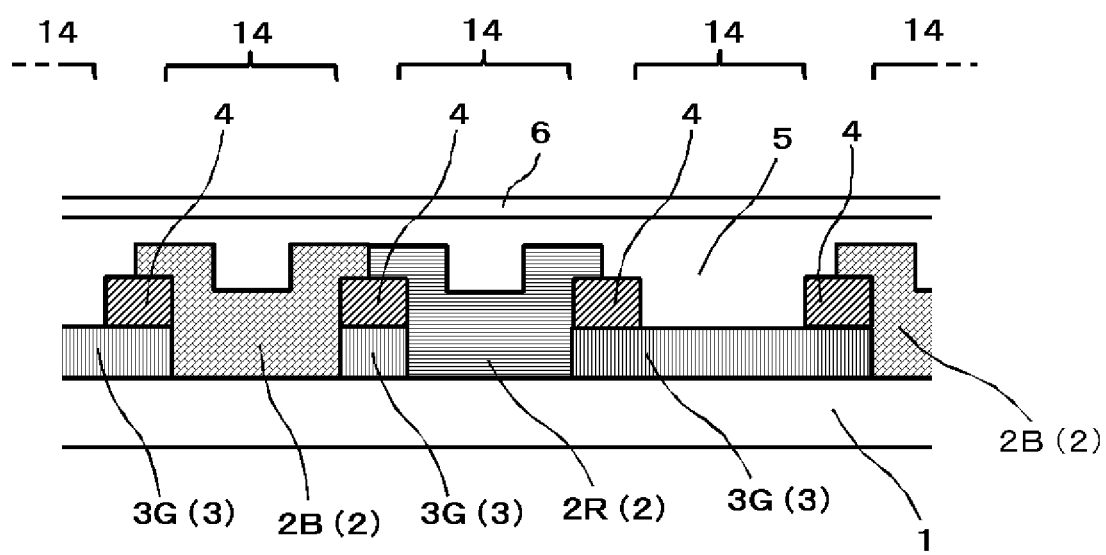
FIG. 27 is a sectional view illustrating a CF substrate of a modification example of the second embodiment of this disclosure.

FIG. 27 is a sectional view illustrating the CF substrate 102*a* of the modification example of the second embodiment of this disclosure.

FIG. 27 is a view corresponding to FIG. 16 of the second embodiment of this disclosure. A configuration of the CF substrate 102*a* will be described. The CF substrate 102*a* of the modification example of the second embodiment of this disclosure is different from the CF substrate 101*a* of the second embodiment of this disclosure in that the color material film 2 is formed to cover the upper surface of the black matrix film 4. Since others are similar to those of the second embodiment of this disclosure, a description thereof is omitted.

In the color filter substrate, the display panel, and the display apparatus of the modification example of the second embodiment of this disclosure, since the color material film 2 is formed to cover the upper surface of the black matrix film 4, even though the bright-spot-defective pixel part 16 occurs, it is possible to further reduce light leakage in a case where the bright-spot-defective pixel part 16 is subjected to blackening spot repair.

In this disclosure, within the scope of the invention, free combinations can be made in the embodiments and appropriate modifications and omission can be made in the embodiments. Furthermore, the "blackening spot repair" includes the meaning that the light transmittance of the bright-spot-defective pixel part is reduced to a certain degree to decrease the luminance of a pixel, so that the pixel is made inconspicuous, as well as complete light blocking on the bright-spot-defective pixel part.

What is claimed is:

1. A color filter substrate comprising:
   a transparent substrate; and
   a black matrix film, a first color material film, a second color material film, a third color material film, and a repair color material film, which are formed on the substrate, wherein
   in a display region, the black matrix film includes a first portion disposed between the first and second color material films, and a second portion disposed between one of the first and second color material films and the third color material film,
   the first color material film is formed to cover a first pixel opening,
   the second color material film is formed to cover a second pixel opening,
   the third color material film is formed to cover a third pixel opening and overlap with the second portion of the black matrix film in a plan view,
   the repair color material film is formed to overlap with the first portion of the black matrix film in a plan view, and
   a corn position of the repair color material film is the same composition as the third color material film.

* * * * *